United States Patent
Matsuda et al.

(10) Patent No.: US 10,017,012 B2
(45) Date of Patent: Jul. 10, 2018

(54) PNEUMATIC TIRE

(71) Applicant: The Yokohama Rubber Co., LTD., Minato-ku, Tokyo (JP)

(72) Inventors: Jun Matsuda, Hiratsuka (JP); Yuji Satoh, Hiratsuka (JP); Masayuki Watanabe, Hiratsuka (JP); Hirokazu Shibata, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 592 days.

(21) Appl. No.: 14/406,174

(22) PCT Filed: Jul. 26, 2013

(86) PCT No.: PCT/JP2013/070351
§ 371 (c)(1),
(2) Date: Dec. 5, 2014

(87) PCT Pub. No.: WO2014/024704
PCT Pub. Date: Feb. 13, 2014

(65) Prior Publication Data
US 2015/0144246 A1    May 28, 2015

(30) Foreign Application Priority Data

Aug. 10, 2012 (JP) .................... 2012-178853
Dec. 14, 2012 (JP) .................... 2012-273807

(51) Int. Cl.
*B60C 1/00* (2006.01)
*B60C 9/02* (2006.01)
(Continued)

(52) U.S. Cl.
CPC .............. *B60C 9/14* (2013.01); *B60C 1/0008* (2013.01); *B60C 1/0041* (2013.01);
(Continued)

(58) Field of Classification Search
CPC ........... B60C 1/00; B60C 1/0041; B60C 5/00; B60C 9/00; B60C 9/02; B60C 9/14
See application file for complete search history.

(56) References Cited

U.S. PATENT DOCUMENTS 6,079,465 A    6/2000  Takeyama et al.
8,978,724 B2   3/2015  Hamanaka
(Continued)

FOREIGN PATENT DOCUMENTS

CN    201863646    6/2011
DE    197 16 179   10/1998
(Continued)

OTHER PUBLICATIONS

International Search Report for International Application No. PCT/JP2013/070351 dated Aug. 27, 2013, 4 pages, Japan.

*Primary Examiner* — Justin R Fischer
(74) *Attorney, Agent, or Firm* — Thorpe North & Western

(57) ABSTRACT

A pneumatic tire is configured in such a manner that at least two carcass layers each have both end portions in the tire width direction extending to bead cores disposed in both bead portions, and the both end portions are wound up from the inner side in the tire width direction of the bead cores to the outer side in the tire width direction, and extend outward in the tire radial direction. In such a pneumatic tire, the carcass layers are formed by thermoplastic sheets, and a rubber layer is disposed at least between adjacent sheets of the thermoplastic sheets.

15 Claims, 13 Drawing Sheets

(51) Int. Cl.
*B60C 9/14* (2006.01)
*B60C 15/00* (2006.01)
*B60C 5/14* (2006.01)

(52) U.S. Cl.
CPC ...... *B60C 15/0009* (2013.01); *B60C 15/0045* (2013.01); *B60C 2005/145* (2013.01); *B60C 2009/0246* (2013.01)

(56) References Cited

U.S. PATENT DOCUMENTS

| | | | |
|---|---|---|---|
| 2010/0319829 | A1 | 12/2010 | Hashimura et al. |
| 2011/0024015 | A1* | 2/2011 | Takahashi ............. B60C 1/0008 152/510 |
| 2016/0107484 | A1 | 4/2016 | Hashimura et al. |

FOREIGN PATENT DOCUMENTS

| | | | |
|---|---|---|---|
| DE | 11 2009 000 960 | | 3/2011 |
| EP | 2103452 | * | 9/2009 |
| EP | 2 251 212 | | 11/2010 |
| GB | 1567361 | * | 5/1980 |
| JP | S35-012158 | | 8/1960 |
| JP | S36-010753 | | 7/1961 |
| JP | S38-015804 | | 7/1963 |
| JP | S42-018001 | | 10/1967 |
| JP | H08-259741 | | 10/1996 |
| JP | 2007-283962 | | 11/2007 |
| JP | 2008-006925 | | 1/2008 |
| JP | 2012-106625 | | 6/2012 |
| JP | 2012-121972 | | 6/2012 |
| WO | WO 2009/110600 | | 9/2009 |
| WO | WO 2009/133823 | | 11/2009 |

* cited by examiner

|  | CONVENTIONAL EXAMPLE | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 | WORKING EXAMPLE 7 |
|---|---|---|---|---|---|---|---|---|
| Carcass layer (reference diagram) | Cord + coating rubber (FIG. 1) | Sheet + rubber layer (FIG. 1) | Sheet + rubber layer (FIG. 1) | Sheet + rubber layer (FIG. 1) | Sheet + rubber layer (FIG. 1) | Sheet + rubber layer (FIG. 1) | Sheet + rubber layer (FIG. 1) | Sheet + rubber layer (FIG. 1) |
| Sheet: Single layer average thickness [mm] | - | 1.10 | 1.00 | 1.00 | 1.00 | 1.00 | 1.00 | 1.00 |
| Sheet: Single layer air permeation coefficient [cc·cm/cm²·sec·cmHg] | - | 510 | 160 | 105 | 84 | 62 | 22 | 10 |
| Rubber layer: Peeling strength [N/25 mm] | - | 2 | 2 | 2 | 3 | 3 | 3 | 3 |
| Sheet: Tensile yield strength [MPa] | - | 0.95 | 0.95 | 0.94 | 0.92 | 0.95 | 0.95 | 0.91 |
| Sheet: Breaking elongation [%] | - | 78 | 77 | 72 | 70 | 66 | 65 | 58 |
| Sheet: End portion position | - | Belt layer outer side | Belt layer outer side | Belt layer outer side | Belt layer outer side | Belt layer outer side | Belt layer outer side | Belt layer outer side |
| Relationship between interval between sheet end portions and belt layer width (CW/BW) | - | - | - | - | - | - | - | - |
| Tensile yield strengths in sheet circumferential direction and sheet width direction ($\beta/\alpha$) | - | 1 | 1 | 1 | 1 | 1 | 1 | 1 |
| Rubber layer: Single layer average thickness [mm] | 0.2 | 0.2 | 0.2 | 0.2 | 0.2 | 0.2 | 0.2 | 0.2 |
| Tire Weight | 100 | 99 | 98 | 98 | 98 | 98 | 98 | 98 |

FIG. 6A

| | WORKING EXAMPLE 8 | WORKING EXAMPLE 9 | WORKING EXAMPLE 10 | WORKING EXAMPLE 11 | WORKING EXAMPLE 12 | WORKING EXAMPLE 13 | WORKING EXAMPLE 14 | WORKING EXAMPLE 15 |
|---|---|---|---|---|---|---|---|---|
| Carcass layer (reference diagram) | Sheet + rubber layer (FIG. 1) | Sheet + rubber layer (FIG. 1) | Sheet + rubber layer (FIG. 1) | Sheet + rubber layer (FIG. 1) | Sheet + rubber layer (FIG. 1) | Sheet + rubber layer (FIG. 1) | Sheet + rubber layer (FIG. 1) | Sheet + rubber layer (FIG. 1) |
| Sheet: Single layer average thickness [mm] | 1.00 | 1.00 | 1.00 | 1.00 | 1.00 | 1.00 | 0.60 | 0.03 |
| Sheet: Single layer air permeation coefficient [cc·cm/cm$^2$·sec·cmHg] | 5 | 3 | 61 | 22 | 3 | 54 | 22 | 16 |
| Rubber layer: Peeling strength [N/25 mm] | 4 | 4 | 4 | 4 | 4 | 4 | 4 | 4 |
| Sheet: Tensile yield strength [MPa] | 0.98 | 0.96 | 0.95 | 0.94 | 1 | 16.1 | 25.4 | 100 |
| Sheet: Breaking elongation [%] | 58 | 55 | 78 | 78 | 78 | 78 | 68 | 42 |
| Sheet: End portion position | Belt layer outer side | Belt layer outer side | Belt layer outer side | Belt layer outer side | Belt layer outer side | Belt layer outer side | Belt layer outer side | Belt layer outer side |
| Relationship between interval between sheet end portions and belt layer width (CW/BW) | - | - | - | - | - | - | - | - |
| Tensile yield strengths in sheet circumferential direction and sheet width direction (β/α) | 1 | 1 | 1 | 1 | 1 | 1 | 1 | 1 |
| Rubber layer: Single layer average thickness [mm] | 0.2 | 0.2 | 0.2 | 0.2 | 0.2 | 0.2 | 0.2 | 0.2 |
| Tire Weight | 98 | 98 | 98 | 98 | 98 | 98 | 97 | 97 |

FIG. 6B

| | WORKING EXAMPLE 16 | WORKING EXAMPLE 17 | WORKING EXAMPLE 18 | WORKING EXAMPLE 19 | WORKING EXAMPLE 20 | WORKING EXAMPLE 21 | WORKING EXAMPLE 22 | WORKING EXAMPLE 23 |
|---|---|---|---|---|---|---|---|---|
| Carcass layer (reference diagram) | Sheet + rubber layer (FIG. 1) | Sheet + rubber layer (FIG. 1) | Sheet + rubber layer (FIG. 1) | Sheet + rubber layer (FIG. 3) | Sheet + rubber layer (FIG. 3) | Sheet + rubber layer (FIG. 3) | Sheet + rubber layer (FIG. 3) | Sheet + rubber layer (FIG. 3) |
| Sheet: Single layer average thickness [mm] | 0.50 | 0.40 | 0.70 | 0.70 | 0.60 | 0.60 | 0.40 | 0.40 |
| Sheet: Single layer air permeation coefficient [cc·cm/cm²·sec·cmHg] | 35 | 20 | 42 | 42 | 33 | 33 | 33 | 33 |
| Rubber layer: Peeling strength [N/25 mm] | 5 | 5 | 5 | 5 | 5 | 5 | 5 | 5 |
| Sheet: Tensile yield strength [MPa] | 46 | 62 | 11.3 | 11.3 | 62 | 62 | 62 | 62 |
| Sheet: Breaking elongation [%] | 80 | 126 | 500 | 500 | 126 | 126 | 126 | 126 |
| Sheet: End portion position | Belt layer outer side | Belt layer outer side | Belt layer outer side | Below belt layer | Below belt layer | Below belt layer | Below belt layer | Below belt layer |
| Relationship between interval between sheet end portions and belt layer width (CW/BW) | - | - | - | 0.08 | 0.10 | 0.95 | 0.50 | 0.50 |
| Tensile yield strengths in sheet circumferential direction and sheet width direction (β/α) | 1 | 1 | 1 | 1 | 1 | 1 | 1.1 | 5 |
| Rubber layer: Single layer average thickness [mm] | 0.2 | 0.2 | 0.2 | 0.2 | 0.2 | 0.2 | 0.2 | 0.2 |
| Tire Weight | 95 | 93 | 98 | 98 | 97 | 97 | 93 | 93 |

FIG. 6C

| Carcass layer (reference diagram) | CONVENTIONAL EXAMPLE Cord + coating rubber (FIG. 1) | WORKING EXAMPLE 24 Cord + coating rubber (FIG. 8) | WORKING EXAMPLE 25 Cord + coating rubber (FIG. 8) | WORKING EXAMPLE 26 Cord + coating rubber (FIG. 9) | WORKING EXAMPLE 27 Cord + coating rubber (FIG. 9) | WORKING EXAMPLE 28 Cord + coating rubber (FIG. 9) |
|---|---|---|---|---|---|---|
| Sheet: Single layer average thickness [mm] | - | 0.41 | 0.41 | 0.28 | 0.28 | 0.18 |
| Sheet: Single layer air permeation coefficient [cc·cm/cm²·sec·cmHg] | - | 61 | 61 | 34 | 34 | 19 |
| Rubber layer: Peeling strength [N/25 mm] | - | 5 | 5 | 5 | 5 | 5 |
| Sheet: Tensile yield strength [MPa] | - | 27.3 | 27.3 | 31.9 | 31.9 | 55.2 |
| Sheet: Breaking elongation [%] | - | 163 | 163 | 149 | 149 | 138 |
| Sheet: End portion position | - | Belt layer outer side | Belt layer outer side | Belt layer outer side | Belt layer outer side | Belt layer outer side |
| Relationship between interval between sheet end portions and belt layer width (CW/BW) | - | - | - | - | - | - |
| Tensile yield strengths in sheet circumferential direction and sheet width direction (β/α) | - | 3 | 3 | 3 | 3 | 3 |
| Rubber layer: Single layer average thickness [mm] | - | 0.15 | 0.10 | 0.15 | 0.10 | 0.25 |
| Tire Weight | 100 | 99 | 97 | 98 | 96 | 99 |

FIG. 7A

| | WORKING EXAMPLE 29 | WORKING EXAMPLE 30 | WORKING EXAMPLE 31 | WORKING EXAMPLE 32 | WORKING EXAMPLE 33 |
|---|---|---|---|---|---|
| Carcass layer (reference diagram) | Cord + coating rubber (FIG. 10) | Cord + coating rubber (FIG. 11) | Cord + coating rubber (FIG. 12) | Cord + coating rubber (FIG. 13) | Cord + coating rubber (FIG. 14) |
| Sheet: Single layer average thickness [mm] | 0.18 | 0.21 | 0.21 | 0.21 | 0.21 |
| Sheet: Single layer air permeation coefficient [cc·cm/cm² ·sec·cmHg] | 19 | 11 | 11 | 11 | 11 |
| Rubber layer: Peeling strength [N/25 mm] | 5 | 5 | 5 | 6 | 6 |
| Sheet: Tensile yield strength [MPa] | 55.2 | 76 | 76 | 76 | 76 |
| Sheet: Breaking elongation [%] | 138 | 122 | 122 | 122 | 122 |
| Sheet: End portion position | Belt layer outer side | Belt layer outer side | Belt layer outer side | Below belt layer | Below belt layer |
| Relationship between interval between sheet end portions and belt layer width (CW/BW) | - | - | - | 0.36 | 0.36 |
| Tensile yield strengths in sheet circumferential direction and sheet width direction (β/α) | 3 | 3 | 3 | 3 | 3 |
| Rubber layer: Single layer average thickness [mm] | 0.20 | 0.20 | 0.20 | 0.20 | 0.20 |
| Tire Weight | 94 | 90 | 92 | 91 | 93 |

FIG. 7B

PNEUMATIC TIRE

TECHNICAL FIELD

The present technology relates to a pneumatic tire, and more particularly relates to a pneumatic tire with an improved carcass layer.

BACKGROUND

Conventionally, for example, in the pneumatic tire according to Japanese Unexamined Patent Application Publication No. 2012-106625A, by making a height H from a bead heel of a bead filler to be from 10 mm to 30 mm to reduce a tire weight and by constituting an inner liner layer, which is disposed on an inner side of a carcass layer, by a thermoplastic resin, or a thermoplastic elastomer composition obtained by blending a thermoplastic resin component with an elastomer component, which has a Young's modulus of 70 MPa to 1,500 MPa and has a thickness of 0.05 mm to 0.25 mm, a steering stability that is deteriorated in accompany with reduction in weight is compensated, and both of reduction in weight and steering stability are simultaneously provided at a high level.

With pneumatic tires of recent years, further reduction in tire weight is desired from a need for environmental contribution such as global warming countermeasures.

SUMMARY

The present technology provides a pneumatic tire that can further reduce a tire weight.

A pneumatic tire of a first example is configured in such a manner that at least two carcass layers each have both end portions in a tire width direction extending to bead cores disposed in both bead portions, and the both end portions are wound up from an inner side in the tire width direction of the bead cores to an outer side in the tire width direction and extend outward in a tire radial direction. In such a pneumatic tire, the carcass layers are formed by thermoplastic sheets, and a rubber layer is disposed at least between adjacent sheets of the thermoplastic sheets.

According to this pneumatic tire, the carcass layers are formed by the thermoplastic sheets, and a rubber layer is disposed at least between adjacent sheets of the thermoplastic sheets. Therefore, the carcass layers function as a tire framework in a similar manner as a carcass layer applied to a typical pneumatic tire in which a carcass cord is disposed in the tire width direction and is coated by a coating rubber. Moreover, the thermoplastic sheet is more lightweight than the carcass cord. As a result, the tire weight can be further reduced.

Furthermore, according to this pneumatic tire, the carcass layers are formed by the thermoplastic sheets; therefore, the carcass layers can suppress air leakage in an inner liner applied to an inner side of a typical pneumatic tire. As a result, the inner liner can be omitted, and the tire weight can be further reduced.

Furthermore, according to this pneumatic tire, the carcass layers are formed by the thermoplastic sheets, thereby allowing a calendar process (process of performing operations such as sheeting rubber (sheeting process) and coating of a woven fabric with rubber (topping process)) to be omitted; therefore, the tire manufacturing process can be simplified.

Furthermore, a pneumatic tire of a second example is configured in such a manner that, in the first example, the thermoplastic sheets each have an average thickness satisfying a range of no less than 0.03 mm and no more than 1.0 mm, and an air permeation coefficient satisfying a range of no less than $3 \times 10^{-12}$ cc·cm/cm$^2$·sec·cmHg and no more than $500 \times 10^{-12}$ cc·cm/cm$^2$·sec·cmHg.

According to this pneumatic tire, the carcass layers remarkably function as a tire framework due to the prescribed thickness of the thermoplastic sheets described above, and remarkably function as an inner liner due to the prescribed air permeation coefficient described above; therefore, a remarkable effect of reducing the tire weight can be obtained.

Furthermore, a pneumatic tire of a third example is configured in such a manner that, in the first or second example, the rubber layer has a peeling strength from the thermoplastic sheets satisfying a range of no less than 50 N/25 mm and no more than N/25 mm.

According to this pneumatic tire, the prescribed peeling strength of the rubber layer described above can improve an adhesive strength between the carcass layers, and as a result, the tire durability can be improved.

Furthermore, a pneumatic tire of a fourth example is configured in such a manner that, in any one of the first to third examples, the rubber layer is a rubber composition containing: a condensate of formaldehyde and a compound represented by formula (1), wherein $R^1$, $R^2$, $R^3$, $R^4$, and $R^5$ represent hydrogen, a hydroxyl group, or an alkyl group having from 1 to 8 carbons; a methylene donor; and a vulcanizing agent; and a compounded amount of the condensate satisfies a range of no less than 0.5 parts by mass and no more than 20 parts by mass relative to 100 parts by mass of a rubber component, a compounded amount of the methylene donor satisfies a range of no less than 0.5 parts by mass and no more than 80 parts by mass relative to 100 parts by mass of the rubber component, and a ratio of the compounded amount of the methylene donor to the compounded amount of the condensate satisfies a range of no less than 1 and no more than 4.

[Formula 1]

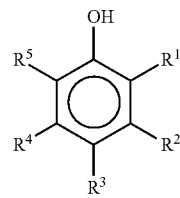

(1)

According to this pneumatic tire, an adhesive strength of the rubber layer with respect to the thermoplastic sheets can be improved. That is, the peeling strength of the rubber layer from the thermoplastic sheets is improved, and the adhesive strength between the carcass layers is improved. As a result, the tire durability can be improved.

Furthermore, a pneumatic tire of a fifth example is configured in such a manner that, in any one of the first to fourth examples, the thermoplastic sheets each have a tensile yield strength at room temperature satisfying a range of no less than 1 MPa and no more than 100 MPa.

According to this pneumatic tire, the prescribed tensile yield strength of the thermoplastic sheets described above allows suppression of plastic deformation when the thermoplastic sheets are pulled to allow a pressure resistance to be improved. The improvement in the pressure resistance can reduce the number of the thermoplastic sheets to be stacked and allows the tire weight to be reduced.

Furthermore, a pneumatic tire of a sixth technology is configured in such a manner that, in any one of the first to fifth examples, the thermoplastic sheets each have a breaking elongation at room temperature satisfying a range of no less than 80% and no more than 500%.

According to this pneumatic tire, for example, even when a local distortion arises in the tire caused by a tool or the like during a rim assembling work, breakage of the thermoplastic sheets can be prevented; therefore, a conventional mounting (rim assembling) device can be used. Moreover, the tire durability during actual use is also improved by ensuring the above breaking elongation.

Furthermore, a pneumatic tire of a seventh example is configured in such a manner that, in any one of the first to sixth examples, at least two belt layers are provided on an outer side in the tire radial direction of the carcass layers, and the thermoplastic sheet with a maximum width in the tire width direction has both end portions in the tire width direction positioned on an inner side in the tire width direction of the end portions in the tire width direction of the belt layer with a maximum width in the tire width direction.

According to this pneumatic tire, configuring the both end portions in the tire width direction of the thermoplastic sheet with the maximum width in the tire width direction so as to be positioned on the inner side in the tire width direction of the end portions in the tire width direction of the belt layer with the maximum width in the tire width direction can prevent a situation where ends of respective members are concentrated at shoulder portions. When ends of respective members are concentrated, a portion where ends face each other becomes a bending point, which tends to reduce the pressure resistance and the durability. That is, according to this pneumatic tire, the occurrence of the bending point can be suppressed, and the pressure resistance and the durability can be improved.

Furthermore, according to this pneumatic tire, disposing a portion of the thermoplastic sheets wound up at the bead core in the side wall portion increases a stack of the thermoplastic sheets in the side wall portion. In such a configuration, the number of the thermoplastic sheets to be stacked is reduced, so that the tire weight can be reduced, and the pressure resistance of the side wall portion can be ensured.

Furthermore, a pneumatic tire of an eighth example is configured in such a manner that, in the seventh example, the thermoplastic sheets have a relationship between an interval CW between the both end portions in the tire width direction of the thermoplastic sheet with the maximum width in the tire width direction, and a width BW in the tire width direction of the belt layer with the maximum width in the tire width direction satisfies a range of $0.10 \leq CW/BW \leq 0.95$.

According to this pneumatic tire, a remarkable effect of improving the pressure resistance and durability can be obtained in the configuration where the both end portions in the tire width direction of the thermoplastic sheet with the maximum width in the tire width direction are positioned on the inner side in the tire width direction of the both end portions in the tire width direction of the belt layer with the maximum width in the tire width direction.

Furthermore, a pneumatic tire of a ninth example is configured in such a manner that, in any one of the first to eighth examples, the thermoplastic sheets have a relationship between a tensile yield strength $\alpha$ with respect to a tire circumferential direction and a tensile yield strength $\beta$ with respect to the tire width direction satisfying a range of $1<\beta/\alpha \leq 5$.

According to this pneumatic tire, making the tensile yield strength $\beta$ with respect to the tire width direction greater than the tensile yield strength $\alpha$ with respect to the tire circumferential direction causes the tire to be more likely to deform in the tire circumferential direction and to be less likely deform in the tire width direction. As a result, a ground contact shape (ground contact length) of the tire can be made more appropriate; therefore, a steering stability can be improved.

The pneumatic tire according to the present technology can further reduce the tire weight.

BRIEF DESCRIPTION OF THE DRAWINGS

FIGS. 6A-6C include a table showing test results of pneumatic tires according to working examples of the present technology.

FIGS. 7A-7B include a table showing test results of pneumatic tires according to working examples of the present technology.

DETAILED DESCRIPTION

An embodiment of the present technology will be described in detail below based on the drawings. Note that this technology is not limited by this embodiment. Moreover, the constituents of this embodiment include those that can be easily replaced by a person skilled in the art or those that are substantially the same. Moreover, a plurality of modified examples described in this embodiment can be combined as desired within the scope of obviousness by a person skilled in the art.

Figure 1:
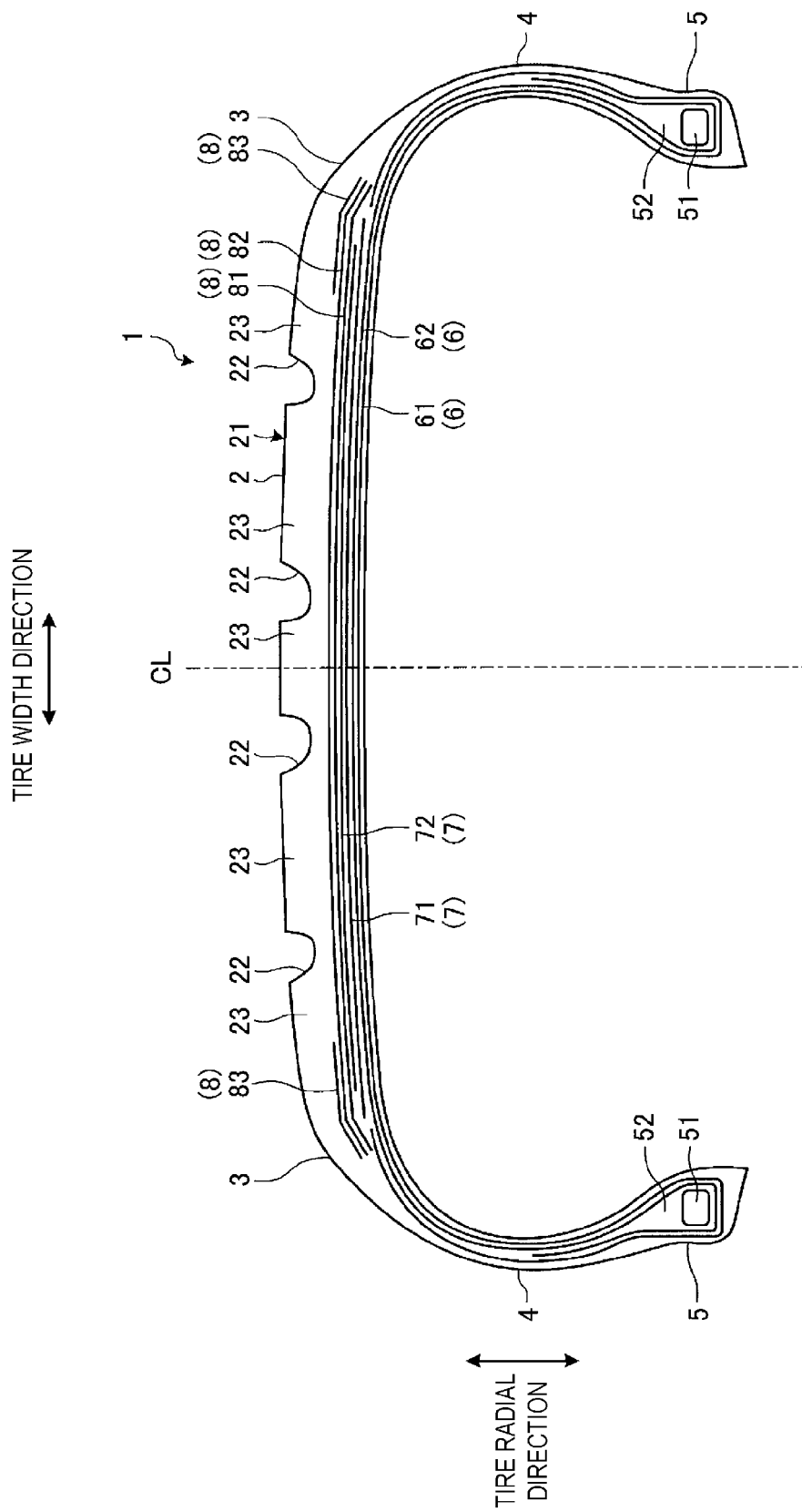
FIG. 1 is a meridian cross-sectional view of a pneumatic tire according to an embodiment of the present technology.

FIG. 1 is a meridian cross-sectional view of a pneumatic tire 1 according to the present embodiment. In the following description, "tire radial direction" refers to a direction orthogonal to the rotational axis (not illustrated) of the pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between portions positioned on the outer sides in the tire width direction, or in other words, the distance between the portions positioned most distant in the tire width direction from the tire equatorial plane CL. "Tire equator line" refers to a line along the tire circumferential direction of the pneumatic tire 1 that lies on the tire equatorial plane CL. In the present embodiment, "tire equator line" is given the same "CL" reference symbol as that used for the tire equatorial plane.

As illustrated in FIG. 1, the pneumatic tire 1 of the present embodiment has a tread portion 2, shoulder portions 3 on both sides of the tread portion 2, and a side wall portion 4 and bead portion 5 that are sequentially connected from each of the shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed on a peripheral surface of the tread portion 2 or, rather, on a road contact surface that comes into contact with a road surface when traveling. The tread surface 21 is provided with a plurality (four in the present embodiment) of main grooves 22 that extend in the tire circumferential direction. Moreover, a plurality of rib-like land portions 23 extending in the tire circumferential direction are formed in the tread surface 21 by the plurality of main grooves 22. Additionally, while not explicitly illustrated in the drawings, lug grooves that intersect with the main grooves 22 in each of the land portions 23 are provided in the tread surface 21. The land portions 23 are plurally divided in the tire circumferential direction by the lug grooves. Additionally, the lug grooves are formed so as to open toward the outside at outermost sides in the tire width direction of the tread portion 2. Note that the lug grooves may have a form that communicates with the main grooves 22 or may have a form that does not communicate with the main grooves 22.

The shoulder portions 3 are locations on both outer sides in the tire width direction of the tread portion 2. Additionally, the side wall portions 4 are exposed at outermost sides in the tire width direction of the pneumatic tire 1. The bead portions 5 each include a bead core 51 and a bead filler 52. The bead core 51 is formed by winding a bead wire constituted by a steal wire into a ring shape. The bead filler 52 is a rubber material disposed in a space formed by an end portion in the tire width direction of the carcass layer 6 being wound up at the bead core 51.

The end portions in the tire width direction of the carcass layer 6 are wound up at the pair of bead cores 51 from the inner side in the tire width direction to the outer side in the tire width direction and extend outward in the tire radial direction, and the carcass layer 6 is stretched in a toroidal shape in the tire circumferential direction to form the tire framework. Details concerning this carcass layer 6 will be described below.

The belt layer 7 has a multi-layer structure where at least two layers (belt layers 71, 72) are stacked, is disposed on the outer side in the tire radial direction that is the periphery of the carcass layer 6 in the tread portion 2, and covers the carcass layer 6 in the tire circumferential direction. The belt layers 71, 72 are constituted by a plurality of cords (not illustrated) disposed parallel with each other at a predetermined angle (for example, 20 to 30 degrees) relative to the tire circumferential direction, and covered by a coating rubber. The cords are formed from steel or organic fibers (e.g. polyester, rayon, nylon, or the like). Moreover, the belt layers 71, 72 located adjacent to each other are disposed so as to intersect their cords.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated) disposed parallel with each other in the tire width direction and substantially parallel (±5 degrees) in the tire circumferential direction, which are covered by a coating rubber. The cords are formed from steel or organic fibers (e.g. polyester, rayon, nylon, or the like). The belt reinforcing layer 8 illustrated in FIG. 1 is constituted by a belt reinforcing layer 81 disposed so as to cover an entirety of the belt layer 7 on the outer side in the tire radial direction of the belt layer 7, a belt reinforcing layer 82 disposed so as to cover the entirety of the belt layer 7 on the outer side in the tire radial direction of the belt reinforcing layer 81, and a belt reinforcing layer 83 disposed so as to cover each of the end portions in the tire width direction of the belt layer 7 on the outer side in the tire width direction of the belt reinforcing layer 82. Note that the configuration of the belt reinforcing layer 8 is not limited as such; while not illustrated in the drawings, the configuration includes a configuration in which the belt reinforcing layer 8 is disposed so as to cover the entirety of the belt layer 7, a configuration in which the belt reinforcing layer 8 is disposed so as to cover each of the end portions in the tire width direction of the belt layer 7, and a configuration in which these are appropriately combined. That is, the belt reinforcing layer 8 overlaps at least both end portions in the tire width direction of the belt layer 7. Additionally, the belt reinforcing layer 8 is provided by winding band-like (e.g. with a width of 10 mm) strip material in the tire circumferential direction.

Figure 2:
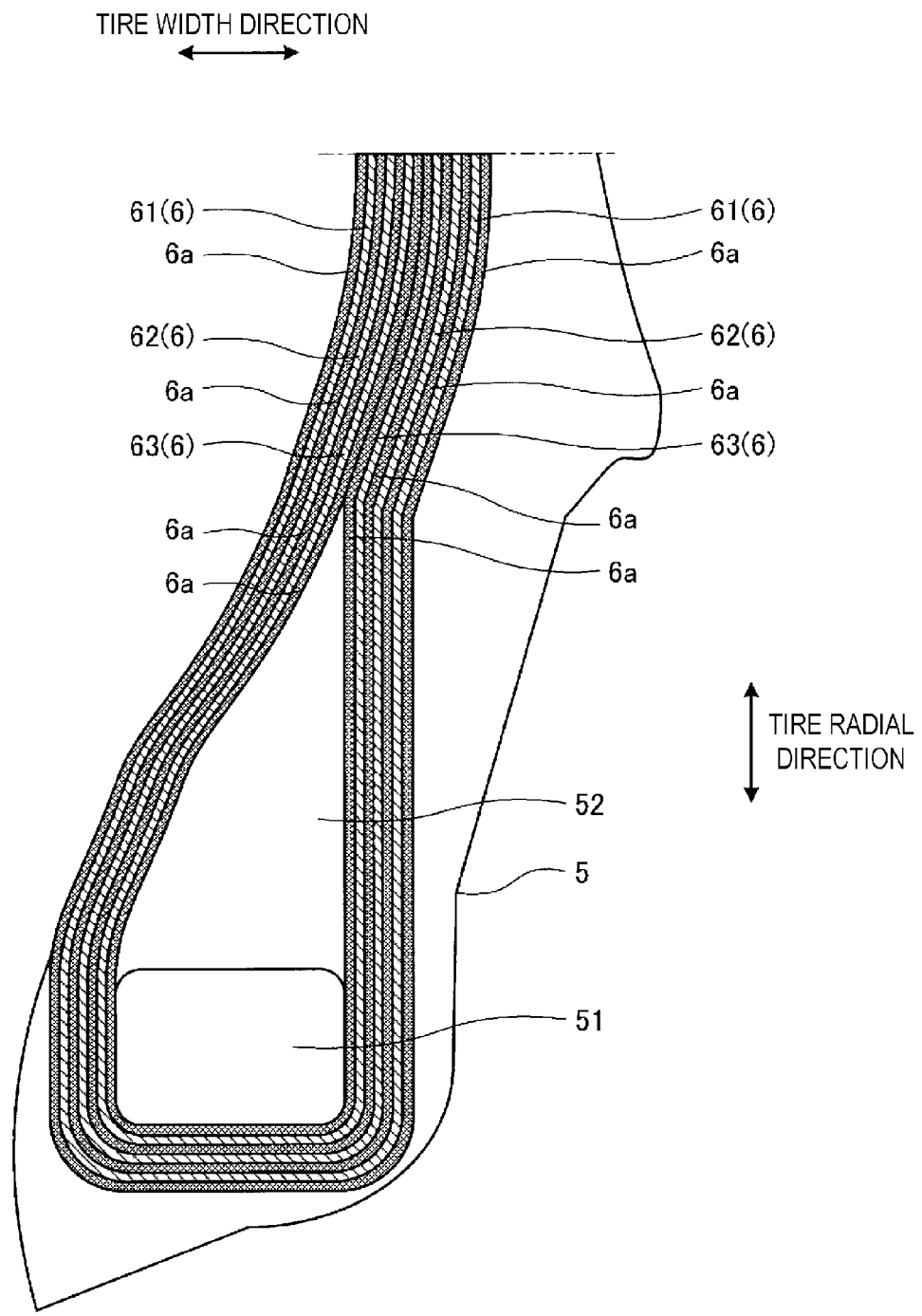
FIG. 2 is a partially enlarged meridian cross-sectional view illustrating a carcass layer of a pneumatic tire according to the embodiment of the present technology.

FIG. 2 is a partially enlarged meridian cross-sectional view illustrating the carcass layer of the pneumatic tire according to the present embodiment.

In the pneumatic tire 1 described above, the carcass layer 6 is constituted by at least two layers (two layers are illustrated in FIG. 1, and three layers are illustrated in FIG. 2) and is formed by thermoplastic sheets (61, 62, 63). Moreover, a rubber layer 6a is disposed between adjacent sheets of the thermoplastic sheets (61, 62, 63). FIG. 2 illustrates a form where the rubber layer 6a is also provided on an outer side of the thermoplastic sheet 61, which is an outermost side at a wound-up portion in the bead portion 5, as well as between adjacent sheets of the thermoplastic sheets (61, 62, 63).

The thermoplastic sheets (61, 62, 63) are constituted by a thermoplastic resin or a thermoplastic elastomer composition obtained by blending an elastomer component in a thermoplastic resin, and do not have cords.

The thermoplastic resin used in the present embodiment includes, for example, a polyamide resin (for example, nylon 6 (N6), nylon 66 (N66), nylon 46 (N46), nylon 11 (N11), nylon 12 (N12), nylon 610 (N610), nylon 612 (N612), a nylon 6/66 copolymer (N6/66), a nylon 6/66/610 copolymer (N6/66/610), nylon MXD6, nylon 6T, nylon 9T, a nylon 6/6T copolymer, a nylon 66/PP copolymer, or a nylon 66/PPS copolymer), a polyester resin (for example, an aromatic polyester such as polybutylene terephthalate (PBT), polyethylene terephthalate (PET), polyethylene isophthalate (PEI), a polybutylene terephthalate/tetramethylene gylcol copolymer, a PET/PEI copolymer, polyarylate (PAR), polybutylene naphthalate (PBN), liquid crystal polyester, or a polyoxyalkylene diimidic diacid/polybutylene terephthalate copolymer), a polynitrile resin (for example, polyacrylonitrile (PAN), polymethacrylonitrile, an acrylonitrile/styrene copolymer (AS), a (meth)acrylonitrile/styrene copolymer, or a (meth)acrylonitrile/styrene/butadiene copolymer), a poly(meth)acrylate resin (for example, polymethylmethacrylate (PMMA), polyethylmethacrylate, an ethylene ethyl acrylate copolymer (EEA), an ethylene acrylate copolymer (EAA), or an ethylene methyl acrylate resin (EMA)), a polyvinyl resin (for example, vinyl acetate (EVA), polyvinylalcohol (PVA), a vinyl alcohol/ethylene copolymer (EVOH), polyvinylidene chloride (PVDC), polyvinyl chloride (PVC), a vinyl chloride/vinylidene chloride copolymer, or a vinylidene chloride/methylacrylate copolymer), a cellulose resin (for example, cellulose acetate or cellulose acetate butyrate), a fluorine resin (for example, polyvinylidene fluoride (PVDF), polyvinyl fluoride (PVF), polychlorofluoroethylene (PCTFE), or a tetrafluoroethylene/ethylene copolymer (ETFE)), an imide resin (for example, aromatic polyimide (PI)), or the like.

The elastomer used in the present embodiment includes, for example, a diene rubber and a hydrogenate thereof (for example, NR, IR, epoxidized natural rubber, SBR, BR (high-cis BR and low-cis BR), NBR, hydrogenated NBR, or hydrogenated SBR), an olefin rubber (for example, ethylene propylene rubber (EPDM, EPM), maleated ethylene propylene rubber (M-EPM)), butyl rubber (IIR), an isobutylene and aromatic vinyl or diene monomer copolymer, acrylic rubber (ACM), an ionomer, a halogen-containing rubber (for example, Br-IIR, Cl-IIR, a brominated copolymer of isobutylene/para-methyl styrene (Br-IPMS), chloroprene rubber (CR), hydrin rubber (CHC, CHR), chlorosulfonated polyethylene (CSM), chlorinated polyethylene (CM), or maleated chlorinated polyethylene (M-CM)), a silicone rubber (for example, methyl vinyl silicone rubber, di-methyl silicone rubber, or methyl phenyl vinyl silicone rubber), a sulfur-containing rubber (for example, polysulfide rubber), a fluororubber (for example, a vinylidene fluoride rubber, a fluorine-containing vinyl ether rubber, a tetrafluoroethylene-propylene rubber, a fluorine-containing silicone rubber, or a fluorine-containing phosphazene rubber), a thermoplastic elastomer (for example, a styrene elastomer, an olefin elastomer, a polyester elastomer, a urethane elastomer, or a polyamide elastomer), or the like.

In this manner, the pneumatic tire 1 of the present technology is configured in such a manner that at least two carcass layers 6 have both end portions in the tire width direction extending to the bead cores 51 disposed in the both bead portions 5, and the both end portions are wound up from the inner side in the tire width direction of the bead cores 51 to the outer side in the tire width direction, and extend outward in the tire radial direction. In the pneumatic tire 1, the carcass layers 6 are formed by the thermoplastic sheets (61, 62, 63), and the rubber layer 6a is disposed at least between adjacent sheets of the thermoplastic sheets (61, 62, 63).

According to this pneumatic tire 1, the carcass layers 6 are formed by the thermoplastic sheets (61, 62, 63) and have the rubber layer 6a disposed at least between adjacent sheets of the thermoplastic sheets (61, 62, 63). The carcass layers 6 can function as a tire framework in a similar manner as a carcass layer applied to a typical pneumatic tire in which a carcass cord is disposed in the tire width direction and is coated by a coating rubber. The thermoplastic sheets (61, 62, 63) are more lightweight than the carcass cord. As a result, the tire weight can be further reduced.

Furthermore, according to this pneumatic tire 1, the carcass layers 6 that are formed by the thermoplastic sheets (61, 62, 63) can suppress air leakage in an inner liner applied to an inner side of a typical pneumatic tire. As a result, the inner liner can be omitted and the tire weight can be further reduced.

Furthermore, according to this pneumatic tire 1, the carcass layers 6 are formed by the thermoplastic sheets (61, 62, 63) thereby allowing a calendar process (process of performing operations such as sheeting rubber (sheeting processing) and coating of a woven fabric with rubber (topping processing)) to be omitted; therefore, the tire manufacturing process can be simplified.

Note that an average thickness of the rubber layer 6a preferably satisfies a range of no less than 0.05 mm and no more than 0.5 mm. The average thickness of no less than 0.05 mm enables manufacturing, and the average thickness of no more than 0.5 mm enables preventing an increase in weight.

Furthermore, in the pneumatic tire 1 of the present embodiment, the thermoplastic sheets (61, 62, 63) constituting the carcass layers 6 preferably each have an average thickness satisfying a range of no less than 0.03 mm and no more than 1.0 mm, and have an air permeation coefficient satisfying a range of no less than $3 \times 10^{-12}$ cc·cm/cm$^2$·sec·cmHg and no more than $500 \times 10^{-12}$ cc·cm/cm$^2$·sec·cmHg.

Here, the average thickness is obtained by cutting a tire to be measured in the tire width direction so that the each cut piece has a width of 20 mm to 30 mm in the tire circumferential direction, dividing the cut piece into at least 8 equal portions in the tire width direction, measuring a thickness of each of the thermoplastic sheets (61, 62, 63) constituting the carcass layers 6, and taking an average for each sheet. Moreover, the air permeation coefficient is obtained according to JIS K7126, "Gas Permeability Test Method of Plastic Film and Sheet (A)" under conditions in which a testing gas is air (N$_2$:O$_2$=8:2) and a testing temperature is 30° C.

According to this pneumatic tire 1, the carcass layers 6 remarkably function as a tire framework due to the prescribed thickness of the thermoplastic sheets (61, 62, 63) described above, and remarkably function as an inner liner due to the prescribed air permeation coefficient described above; therefore, a remarkable effect of reducing the tire weight can be obtained. Note that, to obtain the remarkable effect of reducing the tire weight in addition to the function as an inner liner, it is further preferable to make the average thickness of each of the thermoplastic sheets (61, 62, 63) satisfy a range of no less than 0.05 mm and no more than 0.6 mm, and, to obtain the further remarkable effect of reducing the tire weight in addition to the function as an inner liner, it is more preferable to make the average thickness of each of the thermoplastic sheets (61, 62, 63) satisfy a range of no less than 0.08 mm to no more than 0.5 mm.

Furthermore, in the pneumatic tire 1 of the present embodiment, it is preferable that the rubber layer 6a have a peeling strength from the thermoplastic sheets (61, 62, 63) satisfying a range of no less than 50 N/25 mm and no more than 400 N/25 mm.

Here, the peeling strength is obtained by measurement according to JIS K6256.

According to this pneumatic tire 1, due to the prescribed peeling strength of the rubber layer 6a described above, an adhesive strength between the carcass layers 6 is improved; therefore, the tire durability can be improved. Note that an upper limit of the peeling strength may exceed 400 N/25 mm, but because adhesion occurs on a metal drum of a feeding device during tire molding, which tends to deteriorate handling characteristics and to make modification difficult, the upper limit is made to be 400 N/25 mm. Note that, to obtain a remarkable effect of improving the durability, it is further preferable to make the peeling strength of the rubber layer 6a satisfy a range of no less than 150 N/25 mm and no more than 400 N/25 mm, and, to obtain a remarkable effect of further improving the durability and of further improving the handling characteristics during tire molding, it is more preferable to make the peeling strength of the rubber layer 6a satisfy a range of no less than 170 N/25 mm and no more than 300 N/25 mm.

Furthermore, in the pneumatic tire 1 of the present embodiment, the rubber layer 6a is a rubber composition containing: a condensate of formaldehyde and a compound represented by formula (1), wherein $R^1$, $R^2$, $R^3$, $R^4$, and $R^5$ represent hydrogen, a hydroxyl group, or an alkyl group having from 1 to 8 carbons; a methylene donor; and a vulcanizing agent; and a compounded amount of the condensate satisfies a range of no less than 0.5 parts by mass and no more than 20 parts by mass relative to 100 parts by mass of a rubber component, a compounded amount of the methylene donor satisfies a range of no less than 0.5 parts by mass and no more than 80 parts by mass relative to 100 parts by mass of the rubber component, and a ratio of the compounded amount of the methylene donor to the compounded amount of the condensate satisfies a range of no less than 1 and no more than 4.

Formula 2

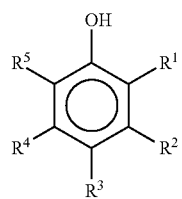

(1)

According to this pneumatic tire 1, the adhesive strength of the rubber layer 6a to the thermoplastic sheets (61, 62, 63) can be improved. That is, the peeling strength of the rubber layer 6a from the thermoplastic sheets (61, 62, 63) is improved, and the adhesive strength between the carcass layers 6 is improved. As a result, durability for the tire can be improved.

Furthermore, in the pneumatic tire 1 of the present embodiment, it is preferable that a tensile yield strength of each of the thermoplastic sheets (61, 62, 63) at room temperature satisfy a range of no less than 1 MPa to no more than 100 MPa.

Here, the tensile yield strength is obtained by measurement according to a test method prescribed in JIS K7113.

According to this pneumatic tire 1, the prescribed tensile yield strength of the thermoplastic sheets (61, 62, 63) described above allows suppression of plastic deformation when the thermoplastic sheets (61, 62, 63) are pulled, so as to improve the pressure resistance. The improvement in the pressure resistance can reduce the number of the thermoplastic sheets (61, 62, 63) to be stacked so as to reduce the tire weight. Note that an upper limit of the tensile yield strength may exceed 100 MPa, but because this tends to make a shape of thermoplastic sheets (61, 62, 63) to be uneven due to enlargement during inflation molding, the upper limit is made to be 100 MPa for ease of manufacturing. Note that it is further preferable to make the above tensile yield strength of the thermoplastic sheets (61, 62, 63) satisfy a range of no less than 2 MPa and no more than 80 MPa so as to obtain a remarkable effect of reducing the number of the thermoplastic sheets (61, 62, 63) to be stacked and of making manufacturing easy.

Furthermore, in the pneumatic tire 1 of the present embodiment, it is preferable that a breaking elongation of each of the thermoplastic sheets (61, 62, 63) at room temperature satisfy a range of no less than 80% and no more than 500%.

According to this pneumatic tire 1, for example, even when a local distortion arises in the tire caused by a tool or the like during a rim assembling work, breakage of the thermoplastic sheets (61, 62, 63) can be prevented; therefore, a conventional mounting (rim assembling) device can be used. Moreover, a tire durability during actual use is also improved by ensuring the above breaking elongation. Note that an upper limit of the breaking elongation may exceed 500%, but it is prescribed as a realizable range. Note that, to obtain a remarkable effect of ensuring the durability of the thermoplastic sheets (61, 62, 63), it is more preferable to make the breaking elongation of the thermoplastic sheets (61, 62, 63) satisfy a range of no less than 100% and no more than 500%.

Figure 3:
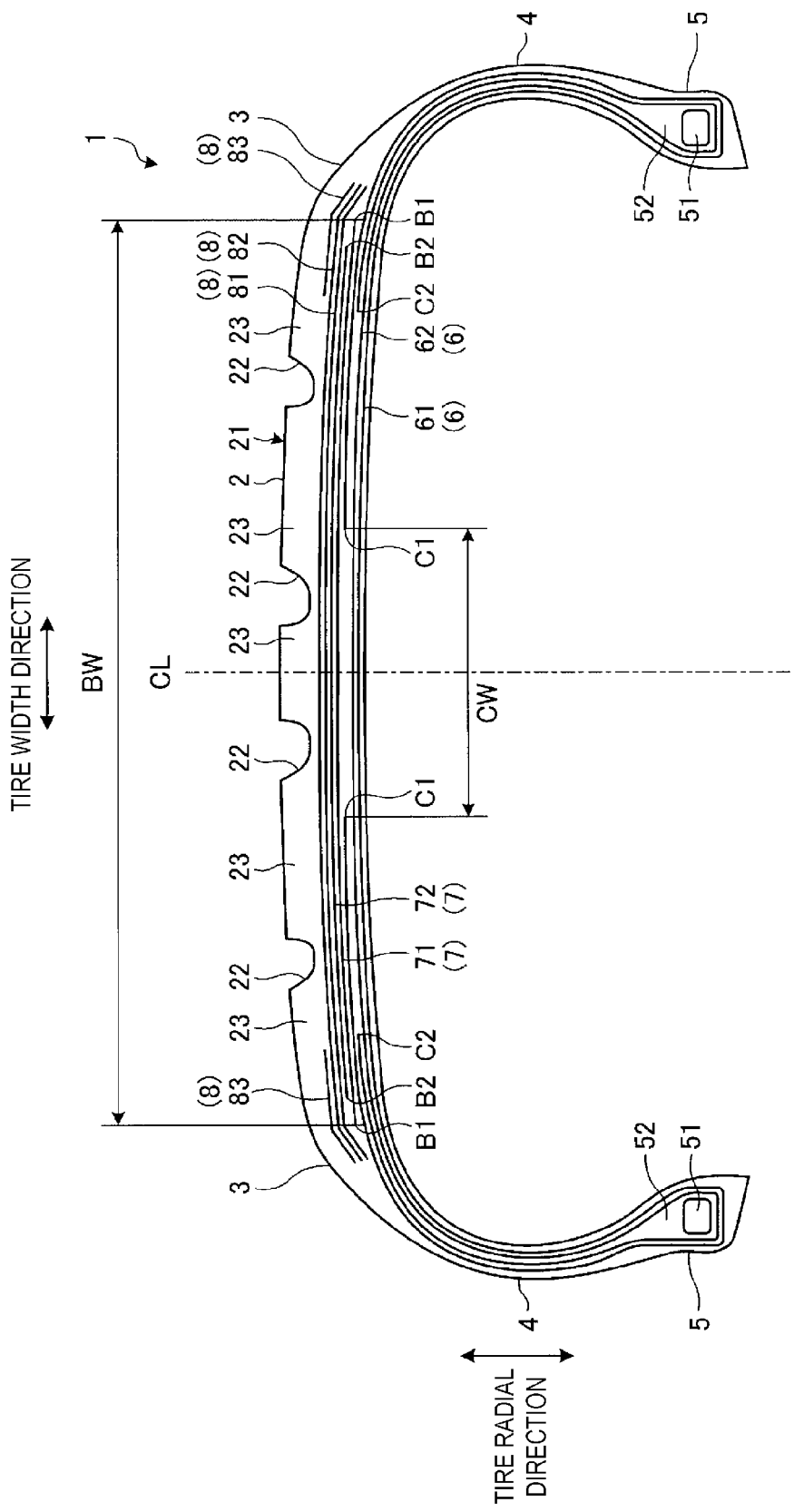
FIG. 3 is a meridian cross-sectional view of a pneumatic tire according to a modified example of the embodiment of the present technology.

Furthermore, in the pneumatic tire 1 of the present embodiment, as illustrated in the meridian cross-sectional view of the pneumatic tire according to the modified example in FIG. 3, it is preferable that both end portions C1 in the tire width direction of a thermoplastic sheet (thermoplastic sheet 61 in FIG. 3) with the maximum width in the tire width direction (maximum development width in the tire width direction) of the thermoplastic sheets (61, 62) be positioned on inner sides in the tire width direction of end portions B1 in the tire width direction of a belt layer (belt layer 71 in FIG. 3) with the maximum width in the tire width direction (maximum development width in the tire width direction).

According to this pneumatic tire 1, configuring the both end portions C1 in the tire width direction of the thermoplastic sheet (thermoplastic sheet 61 in FIG. 3) with the maximum width in the tire width direction so as to be positioned on the inner sides in the tire width direction of the end portions B1 in the tire width direction of the belt layer (belt layer 71 in FIG. 3) with the maximum width in the tire width direction can prevent a situation where ends of members are concentrated at the shoulder portion 3. When the ends of members are concentrated, a portion where ends face each other becomes a bending point, which tends to deteriorate the pressure resistance and the durability. That is, according to this pneumatic tire 1, the occurrence of the bending point can be suppressed, and the pressure resistance and the durability can be improved.

Furthermore, disposing a portion where the thermoplastic sheets (61, 62) are wound up at the bead cores 51 in the side wall portions 4 increases a stack of the thermoplastic sheets (61, 62) (twice in FIG. 3) in the side wall portions 4. By configuring in this manner, the number of the thermoplastic sheets (61, 62) to be stacked is reduced so that the tire weight can be reduced, and the pressure resistance of the side wall portions 4 can be ensured.

Note that, in FIG. 3, both end portions C2 in the tire width direction of the thermoplastic sheet (thermoplastic sheet 62 in FIG. 3), the thermoplastic sheet not having the maximum width in the tire width direction, are also configured to be positioned on the inner sides in the tire width direction of the end portions B1 in the tire width direction of the belt layer (belt layer 71 in FIG. 3) with the maximum width in the tire width direction. By configuring in this manner, the occurrence of the bending point can be further suppressed, and a remarkable effect of improving the pressure resistance and the durability can be obtained. Moreover, in FIG. 3, the both end portions C1 in the tire width direction of the thermoplastic sheet (thermoplastic sheet 61 in FIG. 3) with the maximum width in the tire width direction, are configured to be positioned on the inner sides in the tire width direction of end portions B2 in the tire width direction of a belt layer (belt layer 72 in FIG. 3), the belt layer not having the maximum width in the tire width direction. By configuring in this manner, the occurrence of the bending point can be further suppressed, and a remarkable effect of improving the pressure resistance and the durability can be obtained. Moreover, in FIG. 3, the both end portions C2 in the tire width direction of the thermoplastic sheet (thermoplastic sheet 62 in FIG. 3), the thermoplastic sheet not having the maximum width in the tire width direction, are configured to be positioned on the inner sides in the tire width direction of the end portions B2 in the tire width direction of the belt layer (belt layer 72 in FIG. 3), the belt layer not having the maximum width in the tire width direction. By configuring in this manner, the occurrence of the bending point can be further suppressed, and a remarkable effect of improving the pressure resistance and the durability can be obtained.

Furthermore, the pneumatic tire 1 of the present embodiment, as illustrated in FIG. 3, is configured in such a manner that the both end portions C1 in the tire width direction of the thermoplastic sheet (thermoplastic sheet 61 in FIG. 3) with the maximum width in the tire width direction, are positioned on the inner sides in the tire width direction of the end portions B1 in the tire width direction of the belt layer (belt layer 71 in FIG. 3) with the maximum width in the tire width direction. In such a configuration, it is preferable that the thermoplastic sheets (61, 62) have a relationship between an interval CW between the both end portions (C1 to C1) in the tire width direction of the thermoplastic sheet (thermoplastic sheet 61 in FIG. 3) with the maximum width in the tire width direction, and the width BW in the tire width direction of the belt layer (belt layer 71 in FIG. 3) with the maximum width in the tire width direction satisfying a range of $0.10 \leq CW/BW \leq 0.95$.

According to this pneumatic tire 1, a remarkable effect of improving the pressure resistance and the durability can be obtained in the configuration where the both end portions C1 in the tire width direction of the thermoplastic sheet (thermoplastic sheet 61 in FIG. 3) with the maximum width in the tire width direction, are positioned on the inner sides in the tire width direction of the end portions B1 in the tire width direction of the belt layer (belt layer 71 in FIG. 3) with the maximum width in the tire width direction. Note that, to obtain a further remarkable effect of improving the pressure resistance and the durability, it is preferable to satisfy a range of $0.15 \leq CW/BW \leq 0.95$.

Furthermore, in the pneumatic tire 1 of the present embodiment, it is preferable that the thermoplastic sheets (61, 62, 63) have a relationship between a tensile yield strength α with respect to the tire circumferential direction and a tensile yield strength β with respect to the tire width direction satisfying a range of $1 < \beta/\alpha \leq 5$.

According to this pneumatic tire 1, making the tensile yield strength β with respect to the tire width direction greater than the tensile yield strength α with respect to the tire circumferential direction causes the tire to be more likely to deform in the tire circumferential direction and to be less likely to deform in the tire width direction. As a result, a ground contact shape (ground contact length) of the tire can be made more appropriate; therefore, a steering stability can be improved.

Note that the following method is provided so as to make the relationship between the tensile yield strength α with respect to the tire circumferential direction and the tensile yield strength β with respect to the tire width direction in the thermoplastic sheets (61, 62, 63) satisfy a range of $1 < \beta/\alpha \leq 5$.

For example, making stretching rates in the tire circumferential direction and the tire width direction of the thermoplastic sheets (61, 62, 63) different from each other by stretch molding leads to different stiffnesses.

Figure 4:
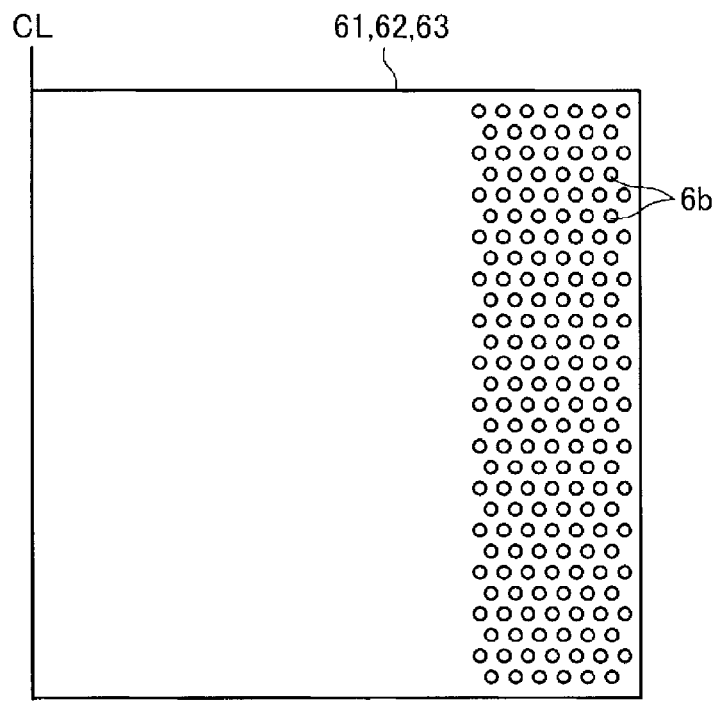
FIG. 4 is a development view illustrating a single thermoplastic sheet of a pneumatic tire according to a modified example of the embodiment of the present technology.

Furthermore, for example, as in the development view illustrating the single thermoplastic sheet of the pneumatic tire according to the modified example in FIG. 4, providing through-holes 6b in predetermined portions of the thermoplastic sheets (61, 62, 63) makes the stretchability in the tire circumferential direction and the tire width direction of the thermoplastic sheets (61, 62, 63) different from each other, thereby leading to different stiffnesses. Note that a shape of the through-hole 6b is not limited; however, with a triangle or the like, there is a possibility that an acute angle portion become a base point of crack growth; therefore, it is preferable that a corner be chamfered or formed in an arc shape, and it is more preferable that all of the through-holes 6b be formed into circles. Moreover, in FIG. 4, the through-holes 6b are provided only at predetermined locations of the thermoplastic sheets (61, 62, 63) but may be provided across an entire surface of the thermoplastic sheets (61, 62, 63). Moreover, the through-holes 6b are preferably spaced equally from each other so as to prevent a local stretching or a local change in the stiffness.

Figure 5:
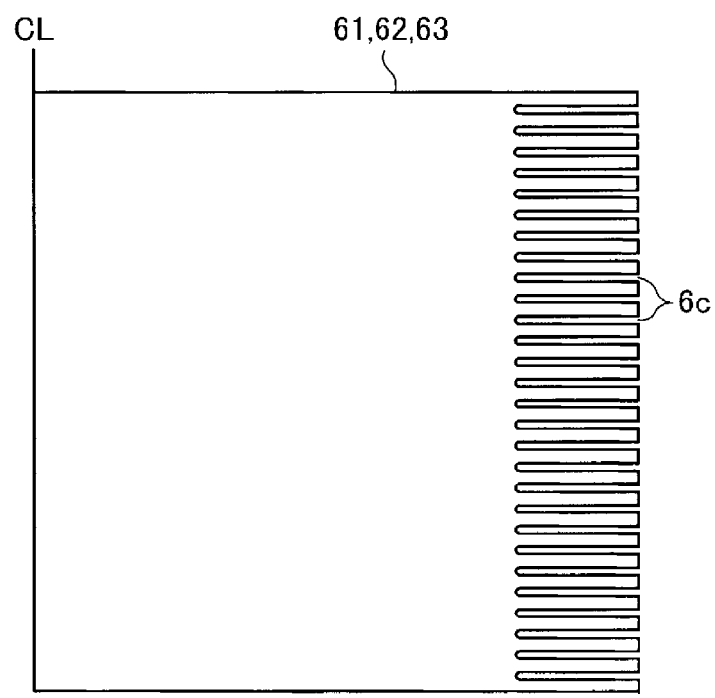
FIG. 5 is a development view illustrating a single thermoplastic sheet of a pneumatic tire according to a modified example of the embodiment of the present technology.

Furthermore, for example, as in the development view illustrating a single thermoplastic sheet of the pneumatic tire according to the modified example in FIG. 5, providing notches 6c in predetermined portions of the thermoplastic sheets (61, 62, 63) makes the stretchability in the tire circumferential direction and the tire width direction of the thermoplastic sheets (61, 62, 63) different from each other, thereby leading to different stiffnesses. Note that the notches 6c may be slits where both ends thereof do not open. Moreover, in FIG. 5, the notches 6c in the radial direction are provided only in predetermined locations of the thermoplastic sheets (61, 62, 63) but may be provided across an entire surface of the thermoplastic sheets (61, 62, 63).

Moreover, the notches 6c are not limited to be provided in the radial direction and may be provided diagonally relative to the tire circumferential direction.

Furthermore, for example, while not demonstrated in the drawings, the thickness of the thermoplastic sheets (61, 62, 63) may be partially changed by preventing the through-holes 6b illustrated in FIG. 4 from penetrating in the thickness direction of the thermoplastic sheets (61, 62, 63) or preventing the notches 6c illustrated in FIG. 5 from penetrating in the thickness direction of the thermoplastic sheets (61, 62, 63).

Incidentally, for the cord of the belt reinforcing layers (81, 82, 83) of the belt reinforcing layer 8, an aliphatic polyamide such as nylon 66 (N66) or nylon 46 (N46), an aromatic polyamide (aramid), polyethylene terephthalate (PET), polyethylene naphthalate (PEN), polyolefin ketone (POK), or a hybrid cord obtained by twisting together yarns constituted by these materials can be used. However, the thermoplastic sheets (61, 62, 63) of the carcass layers 6 are thermoplastic materials that soften immediately after being released from a mold, and this tends to change the tire shape due to thermal shrinkage of the belt reinforcing layer 8. To prevent this situation, a belt reinforcing layer 8 with low thermal shrinkage characteristics is preferable.

WORKING EXAMPLES

FIGS. 6A-6C and 7A-7B are tables showing test results of pneumatic tires according to the present working examples, and FIGS. 8 to 14 are schematic meridian cross-sectional views of the pneumatic tires according to the present working examples.

In the present working examples, tests concerning the tire weight were performed for a plurality of types of pneumatic tires with different conditions.

In the testing method, pneumatic tires of a tire size of 235/40R18 as test tires were used to measure weights of these test tires. Moreover, the weights were indexed based on the measurement results with the conventional example set as the standard score (100). The less the index, the lighter and more superior the tire weight.

As illustrated in FIGS. 6A-6C and 7A-7B, in the pneumatic tire of the conventional example, as seen in FIG. 1, two carcass layers with the cords covered with the coating rubber are disposed so as to be two layers on the tire equatorial plane CL, and to be four layers in the side wall portion 4.

Meanwhile, as illustrated in FIGS. 6A-6C and 7A-7B, the pneumatic tires of the Working Examples 1 to 33 are configured in such a manner that the carcass layers are constituted by thermoplastic sheets, and the rubber layer is disposed between adjacent sheets of the thermoplastic sheets. As illustrated in FIGS. 6A-6C, in the pneumatic tires of the Working Examples 1 to 18, as illustrated in FIG. 1, two thermoplastic sheets (61, 62) are disposed so as to be two layers on the tire equatorial plane CL, and to be four layers in the side wall portion 4. Moreover, in the pneumatic tires of the Working Examples 19 to 23, as illustrated in FIG. 3, two thermoplastic sheets (61, 62) are disposed so as to be two layers on the tire equatorial plane, and to be four layers in the side wall portion 4. The both end portions of the thermoplastic sheets are positioned on a lower side (inner side in the tire radial direction) of the belt layer 7. Moreover, in the pneumatic tires of the Working Examples 2 to 23 of the Working Examples 1 to 23, the thermoplastic sheets have the average thickness and air permeation coefficient satisfying the prescribed ranges. In the pneumatic tires of the Working Examples 8 to 23, the peeling strength of the rubber layer satisfies the prescribed range. In the pneumatic tire of the Working Examples 10 to 23, the tensile yield strength of the thermoplastic sheets satisfies the prescribed range. In the pneumatic tires of the Working Examples 16 to 23, the breaking elongation of the thermoplastic sheets satisfies the prescribed range. In the pneumatic tires of the Working Examples 20 to 23, the relationship (CW/BW) between the end portions of the thermoplastic sheets and the width of the belt layer satisfies the prescribed range. In the pneumatic tires of the Working Examples 22 and 23, the relationship ($\beta/\alpha$) between the tensile yield strengths in the tire circumferential direction and the tire width direction of the thermoplastic sheets satisfies the prescribed range.

Figure 8:
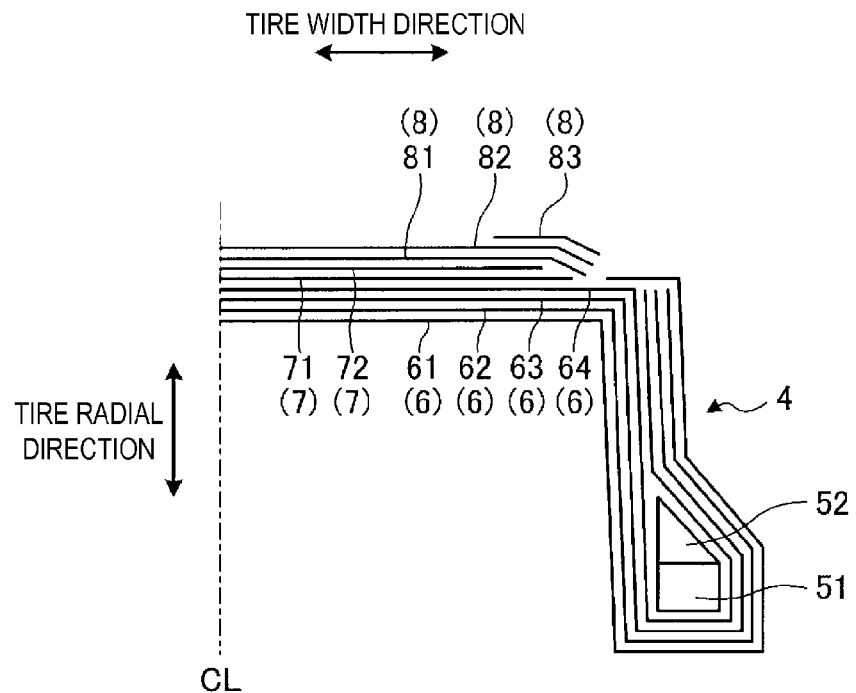
FIG. 8 is a schematic meridian cross-sectional view of a pneumatic tire according to the working examples of the present technology.
Figure 9:
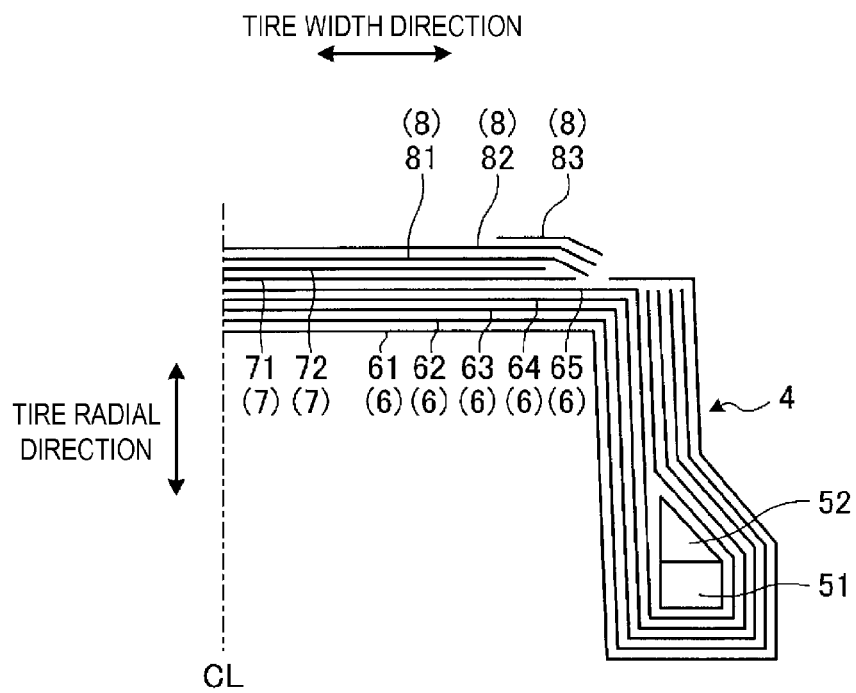
FIG. 9 is a schematic meridian cross-sectional view of a pneumatic tire according to the working examples of the present technology.
Figure 10:
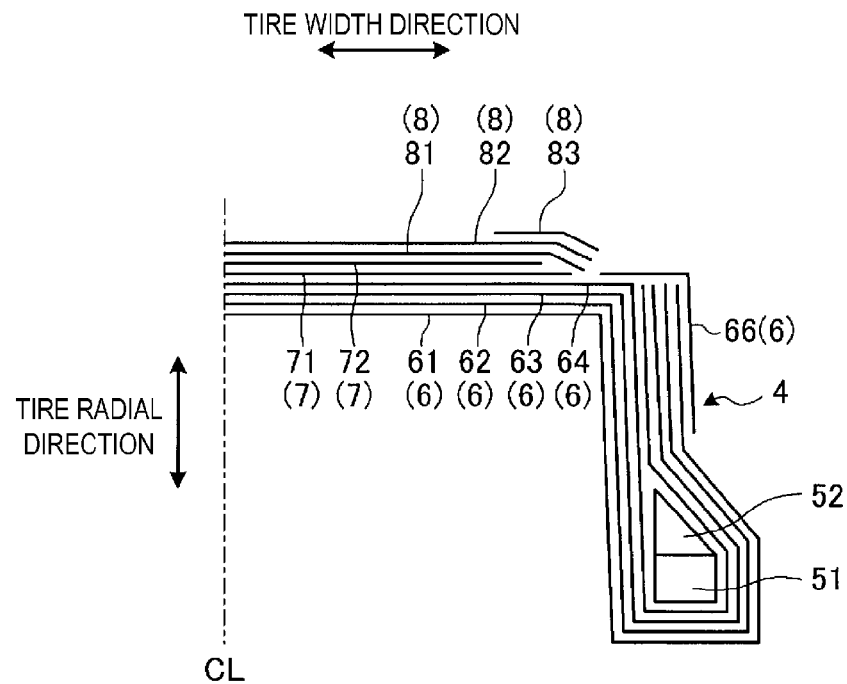
FIG. 10 is a schematic meridian cross-sectional view of a pneumatic tire according to the working examples of the present technology.
Figure 11:
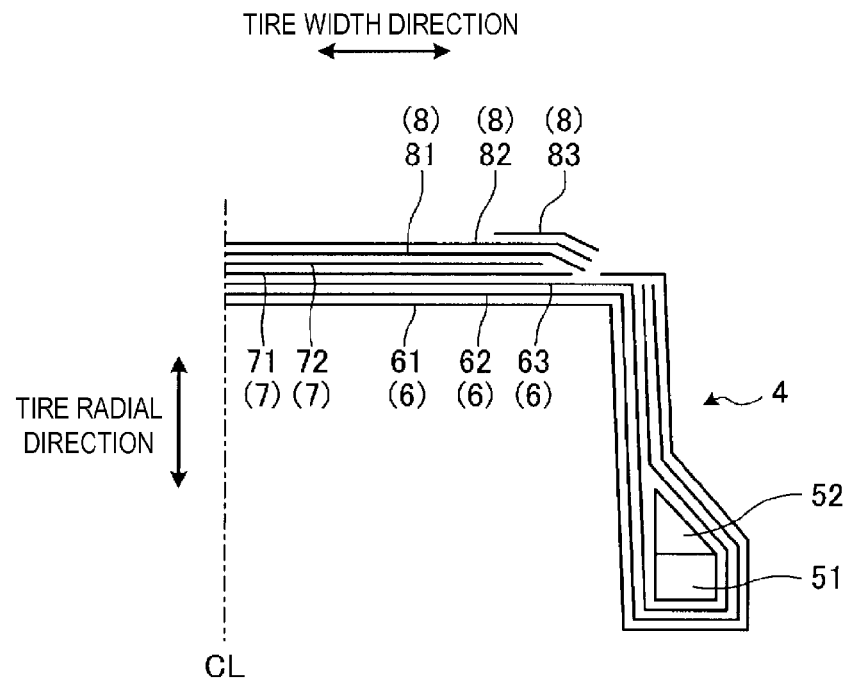
FIG. 11 is a schematic meridian cross-sectional view of a pneumatic tire according to the working examples of the present technology.
Figure 12:
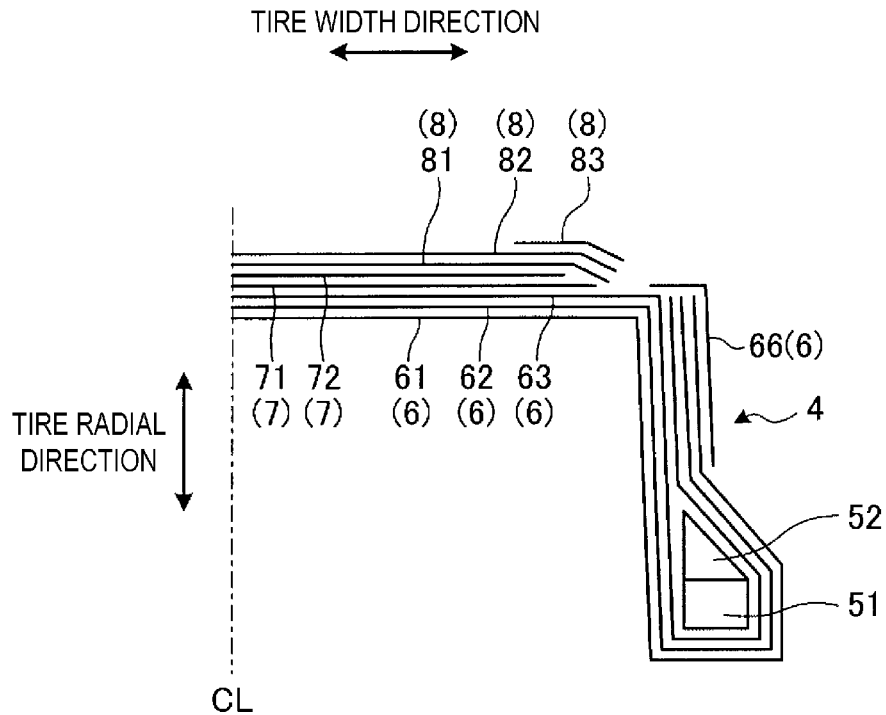
FIG. 12 is a schematic meridian cross-sectional view of a pneumatic tire according to the working examples of the present technology.
Figure 13:
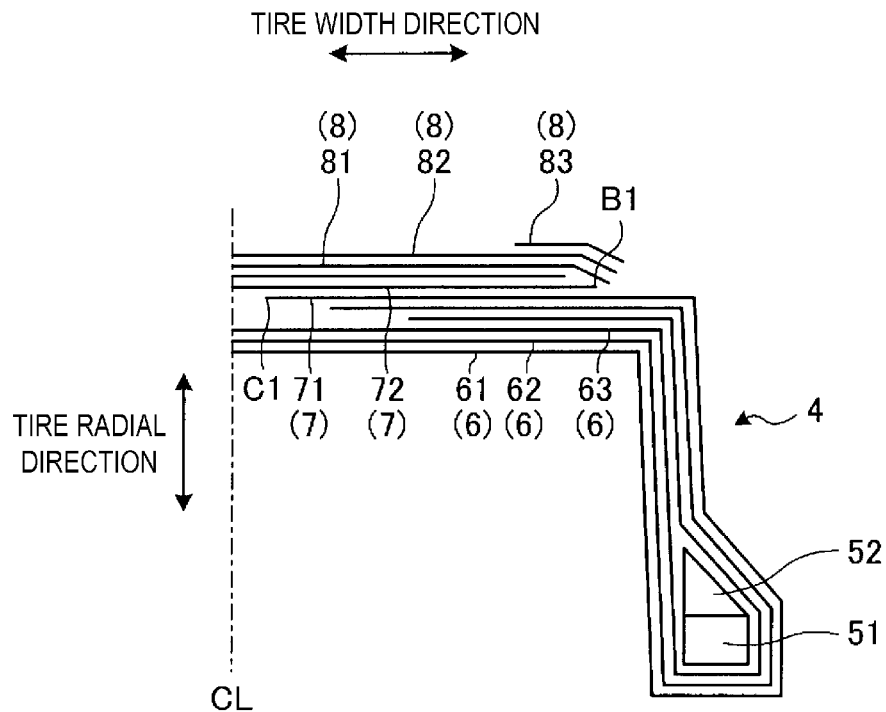
FIG. 13 is a schematic meridian cross-sectional view of a pneumatic tire according to the working examples of the present technology.
Figure 14:
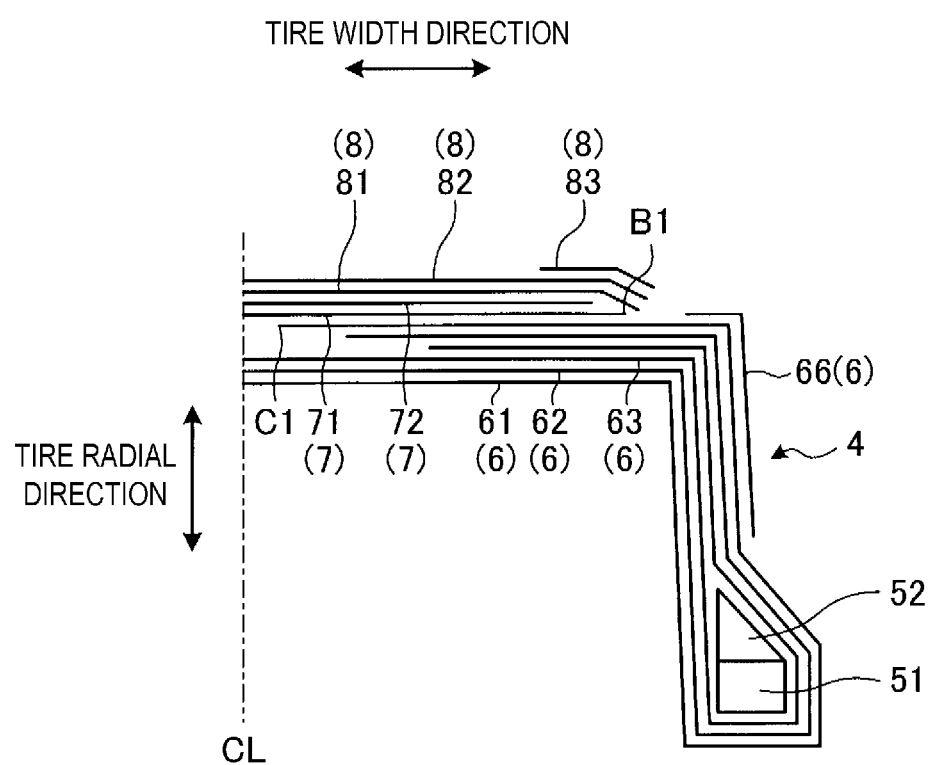
FIG. 14 is a schematic meridian cross-sectional view of a pneumatic tire according to the working examples of the present technology.

Furthermore, as illustrated in FIGS. 7A-7B, in the pneumatic tires of the Working Examples 24 and 25 as illustrated in FIG. 8, four thermoplastic sheets (61, 62, 63, 64) are disposed so as to be four layers on the tire equatorial plane CL, and to be eight layers in the side wall portion 4. In the pneumatic tires of the Working Examples 26 to 28 as illustrated in FIG. 9, five thermoplastic sheets (61, 62, 63, 64, 65) are disposed so as to be five layers on the tire equatorial plane CL, and to be ten layers in the side wall portion 4. In the pneumatic tire of the Working Example 29 as illustrated in FIG. 10, four thermoplastic sheets (61, 62, 63, 64) are disposed so as to be four layers on the tire equatorial plane CL, and to be eight layers in the side wall portion 4. In addition, a thermoplastic sheet (66) is disposed so as to be one layer in the side wall portion 4. In the pneumatic tire of the Working Example 30 as illustrated in FIG. 11, three thermoplastic sheets (61, 62, 63) are disposed so as to be three layers on the tire equatorial plane CL, and to be six layers in the side wall portion 4. In the pneumatic tire of the Working Example 31 as illustrated in FIG. 12, three thermoplastic sheets (61, 62, 63) are disposed so as to be three layers on the tire equatorial plane CL, and to be six layers in the side wall portion 4. In addition, the thermoplastic sheet (66) is disposed so as to be one layer in the side wall portion 4. In the pneumatic tire of the Working Example 32 as illustrated in FIG. 13, three thermoplastic sheets (61, 62, 63) are disposed so as to be three layers on the tire equatorial plane CL, and to be six layers in the side wall portion 4. The both end portions of the thermoplastic sheets are positioned on the lower side (inner side in the tire radial direction) of the belt layer 7. In the pneumatic tire of the Working Example 33 as illustrated in FIG. 14, three thermoplastic sheets (61, 62, 63) are disposed so as to be three layers on the tire equatorial plane CL, and to be six layers in the side wall portion 4. The both end portions of the thermoplastic sheets are positioned on the lower side (inner side in the tire radial direction) of the belt layer 7, and the thermoplastic sheet (66) is disposed so as to be one layer in the side wall portion 4. Moreover, the pneumatic tires of the Working Examples 24 to 33 have the average thickness and air permeation coefficient satisfying the prescribed ranges. The peeling strength of the rubber layer satisfies the prescribed range. The tensile yield strength of the thermoplastic sheets satisfies the prescribed range. The breaking elongation of the thermoplastic sheets satisfies the prescribed range. The relationship ($\beta/\alpha$) between the tensile yield strengths in the tire circumferential direction and the tire width direction of the thermoplastic sheets satisfies the prescribed range. Moreover, the pneumatic tires of the working examples 32 and 33 have the relationship (CW/BW) between the end portions of the thermoplastic sheet and the width of the belt layer satisfying the prescribed range.

Note that, for the peeling strength of the rubber layer, a specimen where rubber layers are stacked on thermoplastic sheets is cut into a strip specimen having a width 25 mm after vulcanization, a peeling strength of the strip specimen is measured according to JIS K6256, and the measured peeling strength (N/25 mm) is indexed into seven stages from (0) to (6) with the criteria below. With this index, (5) or more is a prescribed range.

(0) . . . No less than 0 [N/25 mm] and less than 20 [N/25 mm]

(1) . . . No less than 20 [N/25 mm] and less than 25 [N/25 mm]

(2) . . . No less than 25 [N/25 mm] and less than 50 [N/25 mm]

(3) . . . No less than 50 [N/25 mm] and less than 75 [N/25 mm]

(4) . . . No less than 75 [N/25 mm] and less than 100 [N/25 mm]

(5) . . . No less than 100 [N/25 mm] and less than 200 [N/25 mm]

(6) . . . No less than 200 [N/25 mm]

As shown in the test results of FIGS. 6A-6C and 7A-7B, it is clear that the pneumatic tires according to the Working Examples 1 to 33 have reduced tire weight.

What is claimed is:

1. A pneumatic tire having at least two carcass layers, the carcass layers each having both end portions in a tire width direction extending to bead cores disposed in both bead portions, and the both end portions being wound up from an inner side in the tire width direction of the bead cores to an outer side in the tire width direction and extending outward in a tire radial direction, wherein
the carcass layers are formed by thermoplastic sheets and do not include cords, and a rubber layer is disposed at least between adjacent sheets of the thermoplastic sheets; and
the thermoplastic sheets have a relationship between a tensile yield strength α with respect to a tire circumferential direction and a tensile yield strength β with respect to the tire width direction satisfying a range of $1<\beta/\alpha\leq5$.

2. The pneumatic tire according to claim 1, wherein the thermoplastic sheets each have an average thickness satisfying a range of no less than 0.03 mm and no more than 1.0 mm, and an air permeation coefficient satisfying no less than $3\times10^{-12}$ cc·cm/cm²·sec·cmHg and no more than $500\times10^{-12}$ cc·cm/cm²·sec·cmHg.

3. The pneumatic tire according to claim 2, wherein the rubber layer has a peeling strength from the thermoplastic sheets satisfying a range of no less than 50 N/25 mm and no more than 400 N/25 mm.

4. The pneumatic tire according to claim 3, wherein the rubber layer is a rubber composition containing: a condensate of formaldehyde and a compound represented by formula (1), wherein $R^1$, $R^2$, $R^3$, $R^4$, and $R^5$ represent hydrogen, a hydroxyl group, or an alkyl group having from 1 to 8 carbons; a methylene donor; and a vulcanizing agent; and
a compounded amount of the condensate satisfies a range of no less than 0.5 parts by mass and no more than 20 parts by mass relative to 100 parts by mass of a rubber component, a compounded amount of the methylene donor satisfies a range of no less than 0.5 parts by mass and no more than 80 parts by mass relative to 100 parts by mass of the rubber component, and a ratio of the compounded amount of the methylene donor to the compounded amount of the condensate satisfies a range of no less than 1 and no more than 4.

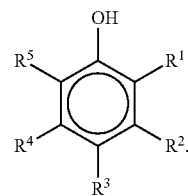

(1)

5. The pneumatic tire according to claim 4, wherein the thermoplastic sheets each have a tensile yield strength at room temperature satisfying a range of no less than 1 MPa and no more than 100 MPa.

6. The pneumatic tire according to claim 5, wherein the thermoplastic sheets each have a breaking elongation at room temperature satisfying a range of no less than 80% and no more than 500%.

7. The pneumatic tire according to claim 6, wherein at least two belt layers are provided on an outer side in the tire radial direction of the carcass layers, and
the thermoplastic sheet with a maximum width in the tire width direction has both end portions in the tire width direction positioned on an inner side in the tire width direction of end portions in the tire width direction of the belt layer with a maximum width in the tire width direction.

8. The pneumatic tire according to claim 7, wherein the thermoplastic sheets have a relationship between an interval CW between the both end portions in the tire width direction of the thermoplastic sheet with the maximum width in the tire width direction, and a width BW in the tire width direction of the belt layer with the maximum width in the tire width direction satisfying a range of $0.10\leq CW/BW\leq0.95$.

9. The pneumatic tire according to claim 1, wherein the rubber layer has a peeling strength from the thermoplastic sheets satisfying a range of no less than 50 N/25 mm and no more than 400 N/25 mm.

10. The pneumatic tire according to claim 1, wherein the rubber layer is a rubber composition containing: a condensate of formaldehyde and a compound represented by formula (1), wherein $R^1$, $R^2$, $R^3$, $R^4$, and $R^5$ represent hydrogen, a hydroxyl group, or an alkyl group having from 1 to 8 carbons; a methylene donor; and a vulcanizing agent; and
a compounded amount of the condensate satisfies a range of no less than 0.5 parts by mass and no more than 20 parts by mass relative to 100 parts by mass of a rubber component, a compounded amount of the methylene donor satisfies a range of no less than 0.5 parts by mass and no more than 80 parts by mass relative to 100 parts by mass of the rubber component, and a ratio of the compounded amount of the methylene donor to the compounded amount of the condensate satisfies a range of no less than 1 and no more than 4.

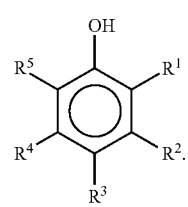

(1)

11. The pneumatic tire according to claim 1, wherein the thermoplastic sheets each have a tensile yield strength at room temperature satisfying a range of no less than 1 MPa and no more than 100 MPa.

12. The pneumatic tire according to claim 1, wherein the thermoplastic sheets each have a breaking elongation at room temperature satisfying a range of no less than 80% and no more than 500%.

13. The pneumatic tire according to claim 1, wherein at least two belt layers are provided on an outer side in the tire radial direction of the carcass layers, and the thermoplastic sheet with a maximum width in the tire width direction has both end portions in the tire width direction positioned on an inner side in the tire width direction of end portions in the tire width direction of the belt layer with a maximum width in the tire width direction.

14. The pneumatic tire according to claim 13, wherein the thermoplastic sheets have a relationship between an interval CW between the both end portions in the tire width direction of the thermoplastic sheet with the maximum width in the tire width direction, and a width BW in the tire width direction of the belt layer with the maximum width in the tire width direction satisfying a range of $0.10 \leq CW/BW \leq 0.95$.

15. The pneumatic tire according to claim 1, wherein the at least two carcass layers comprises at least three carcass layers formed by the thermoplastic sheets and the rubber layer comprises at least two rubber layers, the thermoplastic sheets and the rubber layers alternating.

\* \* \* \* \*